United States Patent [19]
Bacha et al.

[11] 3,903,180
[45] *Sept. 2, 1975

[54] MAKING NITROCYCLOPROPANE FROM 3-CHLORO-1-NITROPROPANE

[75] Inventors: John D. Bacha; Charles M. Selwitz, both of Monroeville, Pa.

[73] Assignee: Gulf Research & Development Company, Pittsburgh, Pa.

[ * ] Notice: The portion of the term of this patent subsequent to Oct. 30, 1990, has been disclaimed.

[22] Filed: Oct. 23, 1973

[21] Appl. No.: 408,276

Related U.S. Application Data

[63] Continuation-in-part of Ser. No. 329,566, Feb. 5, 1973, Pat. No. 3,769,355.

[52] U.S. Cl. .............................................. 260/644
[51] Int. Cl.$^2$ .......................................... C07C 79/08
[58] Field of Search .................................... 260/644

[56] References Cited
UNITED STATES PATENTS

| | | | |
|---|---|---|---|
| 3,100,805 | 8/1963 | Bay | 260/644 |
| 3,100,806 | 8/1963 | Bay | 260/644 |

OTHER PUBLICATIONS

Rodd's Chemistry of Carbon Compounds, S. Coffey, Editor, 2nd Ed., Vol. II, Part A, Elsevier Pub. Co., London, 1964, p. 45.

*Primary Examiner*—Leland A. Sebastian

[57] ABSTRACT

Nitrocyclopropane is prepared by reacting 3-chloro-1-nitropropane with an amine which has a polar center in addition to an amino function in the presence of a polar, aprotic solvent. For example, the reaction of 3-chloro-1-nitropropane with ethylene diamine in the presence of dimethyl sulfoxide produces nitrocyclopropane in high yield.

13 Claims, No Drawings

MAKING NITROCYCLOPROPANE FROM 3-CHLORO-1-NITROPROPANE

This is a continuation-in-part of our U.S. Pat. Application Ser. No. 329,566, filed Feb. 5, 1973 now U.S. Pat. No. 3,769,355.

This invention relates to a method of making nitrocyclopropane. More particularly, this invention relates to a method of making nitrocyclopropane in good yield by the reaction of 3-chloro-1-nitropropane with an amine which has a polar center in addition to an amino function, such as benzyl amine and ethylenediamine.

In our prior application we describe a method of making nitrocyclopropane in good yield by the reaction of 3-chloro-1-nitropropane with a base in the presence of a polar, aprotic solvent. We described in that application various alkali metal and alkaline earth metal compounds and the simple alkyl or cycloalkyl amines as suitable base reactants for this reaction. We have now unexpectedly discovered that various amines which contain a polar center in addition to an amino function will react with 3-chloro-1-nitropropane in a polar, aprotic solvent with the production of nitrocyclopropane in good yield. The amines in this new class contain at least one polar center such as an aromatic nucleus or a hetero-function in addition to the reacting amino function. These amines include aryl-substituted alkylamines, saturated heterocyclic amines, alkyl polyamines, alkanol amines, and the like. The use of the polar, aprotic solvent is of critical significance in obtaining the high yields of our invention.

Useful polar, aprotic solvents include the sulfoxides, the sulfones, the di-N-substituted carboxylic acid amides, the N-substituted pyrrolidones, and the like. The sulfoxides are defined by the formula $R_1(R_2)S{:}O$ in which $R_1$ and $R_2$ are independently selected from lower alkyl, phenyl and benzyl and chlorine substituted derivatives thereof. Dimethyl sulfoxide is the preferred sulfoxide. Also useful are diethyl sulfoxide, di-n-propyl sulfoxide, di-n-butyl sulfoxide, di-2-chloroethyl sulfoxide, diphenyl sulfoxide, methyl phenyl sulfoxide, benzyl phenyl sulfoxide, dibenzyl sulfoxide, and the like. The sulfones are defined by the formula $R_3(R_4)SO_2$ in which $R_3$ and $R_4$ are independently selected from lower alkyl and can be joined together to form a cyclic compound having from three to eight members in the ring. Sulfolane also known as tetramethylene sulfone is the preferred sulfone. Also useful are dimethyl sulfone, diethyl sulfone, trimethylene sulfone, pentamethylene sulfone, hexamethylene sulfone, and the like.

The di-N-substituted carboxylic acid amides are defined by the formula $R_5CONR_6(R_7)$ in which $R_5$ is hydrogen or lower alkyl and $R_6$ and $R_7$ are independently lower alkyl. Preferred di-N-substituted carboxylic acid amides are dimethyl formamide and dimethyl acetamide. Also useful are diethyl formamide, diethyl acetamide, di-n-propyl acetamide, di-t-butyl acetamide, dimethyl butyramide, dimethyl propionamide, and the like. The useful N-substituted pyrrolidones include the N-lower alkyl alpha and beta pyrrolidones. Preferred are N-methyl pyrrolidone and N-ethyl pyrrolidone. Other polar, aprotic solvents are useful herein such as hexamethylenephosphoramide and the like. As used herein, lower alkyl includes alkyl groups having from one to about four carbon atoms. Suitable mixtures of two or more polar, aprotic solvents can also be used.

The amines which are used herein for reaction with the 3-chloro-1-nitropropane contain at least one polar center in addition to an amino function. Included in this class of amines are the mononuclear, monoaryl-substituted alkyl, primary or secondary amines having one to eight carbon atoms in each alkyl portion and including substituents on the benzene ring which are inert in the reaction, such as chloro, bromo, lower alkyl, and the like. Examples of these amines are benzylamine, dibenzylamine, tolylamine, xylylamine, dichlorobenzylamine, 2-phenylethylamine, cumylamine 6-bromophenyloctylamine, and the like. Also included in this class of amines which contain a polar center in addition to an amino function are the saturated aliphatic amines in which the polar center is a heterofunction. The hetero-function can be etheric oxygen, hydroxyl, amino and the like. Examples of amines which contain this hetero-function are the saturated heterocyclic amines having a five or six membered ring in which the heteroatom can be oxygen or a second nitrogen atom such as morpholine, piperazine, imidazolidine, and the like. Another group of useful amines which contain this hetero-function are the non-cyclic, alkyl polyamines defined by the formula $H_2N(RNH)_nH$ where R is lower hydrocarbyl radical having from two to four carbon atoms and $n$ is from 1 to 5. This group is represented by ethylene diamine, diethylenetriamine, triethylenetetraamine, pentaethylenehexamine, propylenediamine, 3-aminopropylamine, 4-aminobutylamine, and the like. A further group of useful amines containing this hetero-function are the amines defined by the formula $H_2N(RO)_nH$ where R and $n$ are defined above. Representative members are ethanolamine, diglycolamine, triglycol amine, tetraglycol amine, pentaglycolamine, aminopropanol, aminobutanol, and the like. A still further group of useful amines which contain the hetero-function are the N-alkylethanolamines in which the alkyl group contains from one to four carbon atoms such as N-methylethanolamine, N-ethylethanolamine, N-butylethanolamine, and the like.

The reaction of the amine with the 3-chloro-1-nitropropane is a liquid phase reaction carried out in the polar, aprotic solvent. This requires that the amine and the solvent be suitably selected to insure that the amine which is used is sufficiently soluble in the desired polar, aprotic solvent to effect reaction at a suitable rate.

The temperature for carrying out the reaction is not critical. At too low a temperature the reaction occurs at an impractical rate, while at too high a temperature undesired decomposition becomes important. Since the reaction rate increases as the temperature increases, an elevated temperature can in many instances be advantageously employed. We find that a broad temperature range of about 0° to about 160° C. is useful. However, we prefer a temperature within the range of about 15° to about 145° C. and most prefer a temperature within the range of about 25° to about 125° C. The reaction can be carried out at atmospheric pressure or at lower or higher pressures. We prefer to use atmospheric pressure or pressures lower than atmospheric. At pressures lower than atmospheric, a semicontinuous mode of operation can be employed, that is, the product is removed as it is formed.

The relative proportion of the 3-chloro-1-nitropropane, the amine and the polar, aprotic solvent that is used is not critical to obtaining reaction. However, we have found that the reaction can be run at greater efficiency when the amount of these materials is controlled within specified ranges. Thus, we have found that a molar ratio of the amine to the 3-chloro-1-nitropropane of about 0.5:1 to about 4:1 is desirable with a ratio of about 1:1 to about 2.5:1 being preferred. In like manner we have found that a volume ratio of polar, aprotic solvent to 3-chloro-1-nitropropane of about 1:1 to about 100:1 is desirable with a volume ratio of about 5:1 to about 50:1 being preferred. Also we have found that a ratio of polar, aprotic solvent in liters to amine in mols of about 0.5:1 to about 10:1 is desirable with about 1:1 to about 5:1 being preferred.

The reaction of the 3-chloro-1-nitropropane and the amine in the polar, aprotic soolvent can be conveniently carried out in a batch operation particularly when large quantities are not required. When conducted batchwise, it is preferred to carry out the reaction until substantially no 3-chloro-1-nitropropane is left in the reactor to avoid any need for reactant recovery and recycle steps. The reaction can also be carried out as a continuous reaction by introducing the reactants and the polar, aprotic solvent into an elongated reactor and maintaining the reaction temperature as the reaction mixture progresses to the outlet. In this continuous procedure the reaction can be carried out at partial conversion with somewhat improved efficiency and with recycle of unreacted 3-chloro-1-nitropropane. In the reaction, whether carried out as a batch or as a continuous reaction, some of the 3-chloro-1-nitropropane is converted to an unidentified by-product.

The following examples are set out to illustrate the novel process of the invention and to provide a better understanding of its details and advantages.

EXAMPLE 1

A 100 ml. flask was charged with 50 ml. of dimethyl sulfoxide and 32 mmols of ethylenediamine. After this solution was heated to 62° C. with stirring, a solution of 16 mmols of 3-chloro-1-nitropropane in 20 ml. of dimethylsulfoxide was added dropwise while stirring continued. Following the addition, stirring was continued at 62° C. At the end of an 80 minute period beginning with the initiation of the reaction, analysis of the product mixture disclosed that 100 percent of the 3-chloro-1-nitropropane had been converted at a yield of 56.3 percent nitrocyclopropane.

EXAMPLE 2

A solution of 16 mmols of 3-chloro-1-nitropropane in 10 ml. of dimethyl sulfoxide was rapidly added to 0.37 mol of ethylenediamine in a 100 ml. flask at 25° C. with stirring. The reaction mixture rose to 40° C. during the course of the reaction. After 12 minutes, the reaction mixture was analyzed. It was found that 100 percent of the 3-chloro-1-nitropropane had been converted at a yield of 44.4 percent nitrocyclopropane.

EXAMPLE 3

A 100 ml. flask was charged with 50 ml. of dimethyl sulfoxide and 32 mmols of ethanolamine. A solution of 16 mmols of 3-chloro-1-nitropropane in 20 ml. of dimethyl sulfoxide was added dropwise to the flask at 62° C. with stirring. Following the addition, stirring was continued at 62° C. After 80 minutes, analysis of the reaction mixture disclosed that 100 percent of the 3-chloro-1-nitropropane had been converted at a yield of 54.6 percent nitrocyclopropane.

EXAMPLE 4

A solution containing 32 mmols of diethylenetriamine and 50 ml. of dimethyl sulfoxide was prepared in a 100 ml. flask. To this solution was added dropwise a solution of 16 mmols of 3-chloro-1-nitropropane in 20 ml. of dimethyl sulfoxide. The reactants were stirred and the temperature was maintained at 57° C. during the course of the reaction. After a total elapsed time of about 85 minutes, analysis of the product mixture disclosed that 100 percent of the 3-chloro-1-nitropropane was converted at a yield of 54.1 percent nitrocyclopropane.

EXAMPLE 5

A solution consisting of 16 mmols of 3-chloro-1-nitropropane in 20 ml. of dimethyl sulfoxide was added dropwise into a 100 ml. flask containing 32 mmols of diglocolamine in 50 ml. of dimethyl sulfoxide. The reactants were stirred at 60° C. during the course of the reaction. After 85 minutes, the conversion of 3-chloro-1-nitrocyclopropane was determined to be about 98 percent at a yield of 49 percent nitrocyclopropane by analysis.

EXAMPLE 6

The reaction was carried out in the 100 ml. flask by the dropwise addition of a solution of 16 mmols of 3-chloro-1-nitropropane and 20 ml. of dimethyl sulfoxide into a solution of 32 mmols of benzylamine in 50 ml. of dimethyl sulfoxide. The reaction mixture was stirred and the temperature was maintained at 60° C. during the course of the reaction. After 2 hours and 25 minutes, analysis disclosed that 99 percent of the 3-chloro-1-nitropropane was converted at a yield of 49.3 percent nitrocyclopropane.

EXAMPLE 7

In this example a solution of 16 mmols of 3-chloro-1-nitropropane in 20 ml. of dimethyl sulfoxide was added dropwise to a solution of 32 mmols of morpholine in 50 ml. of dimethyl sulfoxide. The reaction mixture was contained in a 100 ml. flask at 61° C. and stirring of the contents continued throughout the course of the reaction. An analysis after 85 minutes revealed a conversion of the 3-chloro-1-nitropropane of 63.5 percent at a yield of 27.1 percent nitrocyclopropane and after 4 hours and 25 minutes total elapsed time a conversion of 86.5 percent and a yield of 35 percent was obtained.

EXAMPLE 8

The general procedure of Example 7 was followed except that aniline was substituted for the morpholine. After 2 hours and 45 minutes, the conversion of 3-chloro-1-nitropropane was determined to be less than 0.5 percent with no identifiable yield of nitrocyclopropane.

Nitrocyclopropane is produced in like manner when 3-chloro-1-nitropropane is reacted with piperazine in the presence of dimethyl formamide, when 3-chloro-1-nitropropane is reacted with di(chlorobenzyl)amine in sulfolane, when 3-chloro-1-nitropropane is reacted with N-methylethanolamine in the presence of dimethylacetamide, when 3-chloro-1-nitropropane is reacted with tolylamine in the presence of N-methyl pyrrolidone, when 3-chloro-1-nitropropane is reacted with propylenediamine in the presence of hexamethylenephosphoramide, and the like.

It is to be understood that the above disclosure is by way of specific example and that numerous modifications and variations are available to those of ordinary skill in the art without departing from the true spirit and scope of our invention.

We claim:

1. A method for preparing nitrocyclopropane which comprises reacting 3-chloro-1-nitropropane with an amine selected from a mononuclear, monoaryl-substituted alkyl, primary or secondary amine having from one to eight carbon atoms in the alkyl portion; a saturated heterocyclic amine having a five or six-membered ring and two nitrogen atoms or one nitrogen atom and one oxygen atom in the ring; and amine having the formula $H_2N(RNH)_nH$ or $H_2N(RO)_nH$, where R is lower hydrocarbyl radical having from two to four carbon atoms and n is an integer from 1 to 5; or an N-lower alkylethanolamine in a polar, aprotic solvent at a temperature between about 0° and 160° C.

2. A method in accordance with claim 1 in which the polar, aprotic solvent is a sulfoxide defined by the formula $R_1(R_2)S{:}O$ in which $R_1$ and $R_2$ are independently lower alkyl, phenyl or benzyl, or a chlorine substituted derivative thereof; a sulfone defined by the formula $R_3(R_4)SO_2$ in which $R_3$ and $R_4$ are independently selected from lower alkyl and can be joined together in a cyclic compound having from three to eight members in the ring; a di-N-substituted carboxylic acid amide defined by the formula $R_5CONR_6(R_7)$ in which $R_5$ is H or lower alkyl and $R_6$ and $R_7$ are independently lower alkyl; an N-lower alkyl alpha or beta pyrrolidone; hexamethylenephosphoramide or a mixture thereof.

3. A method for preparing nitrocyclopropane in accordance with claim 1 in which the polar, aprotic solvent is dimethyl sulfoxide, dimethylformamide, dimethylacetamide or sulfolane.

4. A method in accordance with claim 1 in which the volume ratio of the polar, aprotic solvent to the 3-chloro-1-nitropropane is between about 1:1 and about 100:1.

5. A method in accordance with claim 4 in which the volume ratio of the solvent aprotic solvent to the 3-chloro-1-nitropropane is between about 5:1 and about 50:1.

6. A method in accordance with claim 1 in which the ratio of the polar, aprotic solvent in liters to the amine in mols is between about 0.5:1 and about 10:1.

7. A method in accordance with claim 6 in which the ratio of the polar, aprotic solvent in liters to the amine in mols is between about 1:1 and about 5:1.

8. A method in accordance with claim 1 in which the molar ratio of the amine to the 3-chloro-1-nitropropane is between about 0.5:1 and about 4:1.

9. A method in accordance with claim 8 in which the molar ratio of the amine to the 3-chloro-1-nitropropane is between about 1:1 and about 2.5:1.

10. A method in accordance with claim 1 in which the temperature is between about 15° and about 145° C.

11. A method in accordance with claim 1 in which the temperature is between about 25° and about 125° C.

12. A method for preparing nitrocyclopropane which comprises reacting 3-chloro-1-nitropropane with ethylenediamine, ethanolamine, diethylenetriamine, diglycolamine or benzylamine in a solvent selected from dimethyl sulfoxide, dimethylformamide, dimethylacetamide or sulfolane at a temperature between about 0° and about 160° C.

13. A method in accordance with claim 12 in which the solvent is dimethyl sulfoxide and the temperature is between about 15° and about 145° C.

* * * * *

UNITED STATES PATENT OFFICE
CERTIFICATE OF CORRECTION

PATENT NO. : 3,903,180
DATED : September 2, 1975
INVENTOR(S) : John D. Bacha and Charles M. Selwitz It is certified that error appears in the above-identified patent and that said Letters Patent are hereby corrected as shown below:

Column 3, line 14, "soolvent" should read --solvent--.

Column 4, line 21, "diglocolamine" should read --diglycolamine--.

Column 5, line 17, "ring; and" should read --ring; an--.

Column 6, line 7, "solvent aprotic" should read --polar, aprotic--.

Signed and Sealed this sixth Day of January 1976

[SEAL]

Attest:

RUTH C. MASON
Attesting Officer

C. MARSHALL DANN
Commissioner of Patents and Trademarks